(12) United States Patent
Leong

(10) Patent No.: US 12,715,128 B2
(45) Date of Patent: Aug. 25, 2026

(54) METHOD AND SYSTEM FOR PROGRAMMING A ROBOT

(71) Applicant: AUGMENTUS PTE. LTD., Singapore (SG)

(72) Inventor: Yong Shin Leong, Singapore (SG)

(73) Assignee: AUGMENTUS PTE. LTD., Singapore (SG)

( * ) Notice: Subject to any disclaimer, the term of this patent is extended or adjusted under 35 U.S.C. 154(b) by 181 days.

(21) Appl. No.: 17/779,061

(22) PCT Filed: Dec. 1, 2020

(86) PCT No.: PCT/SG2020/050709
§ 371 (c)(1),
(2) Date: May 23, 2022

(87) PCT Pub. No.: WO2021/118458
PCT Pub. Date: Jun. 17, 2021

(65) Prior Publication Data

US 2022/0410394 A1 Dec. 29, 2022

(30) Foreign Application Priority Data

Dec. 9, 2019 (WO) ................ PCT/SG2019/050606

(51) Int. Cl.
*B25J 9/16* (2006.01)
*B25J 13/08* (2006.01)
*G06T 7/70* (2017.01)

(52) U.S. Cl.
CPC ........... *B25J 9/1664* (2013.01); *B25J 9/1671* (2013.01); *B25J 9/1697* (2013.01); *B25J 13/08* (2013.01);
(Continued)

(58) Field of Classification Search
CPC ...... B25J 9/1664; B25J 9/1671; B25J 9/1697; B25J 13/08; B25J 13/089;
(Continued)

(56) References Cited

U.S. PATENT DOCUMENTS 9,495,585 B2 * 11/2016 Bicer .................. G06V 40/107
9,919,427 B1 * 3/2018 Guilbert ................ B25J 9/1664
(Continued)

FOREIGN PATENT DOCUMENTS

JP 2001060108 A * 3/2001
KR 101471852 B1 12/2014

OTHER PUBLICATIONS

JP 2001-060108 A, Saito, “Device and Method for Teaching Robot Action”, Filed: Feb. 1, 2000, Pub: Mar. 6, 2001, English Translation (Year: 2001).*

(Continued)

*Primary Examiner* — Jason Holloway
*Assistant Examiner* — Benjamin J Brosh
(74) *Attorney, Agent, or Firm* — Richard C. Himelhoch; UB Greensfelder LLP

(57) ABSTRACT

A method comprising identifying a robotic device and a calibration fixture in a vicinity of the robotic device; referencing the calibration fixture to a base of the robotic device to determine a first pose of the robotic device; receiving a 3D image of the environment, wherein the 3D image includes the calibration fixture; determining a second pose of the calibration fixture relative to the sensor; determining a third pose of the robotic device relative to the sensor based on the first pose and the second pose; receiving a plurality of trajectory points; determining a plurality of virtual trajectory points corresponding to the plurality of trajectory points based on the 3D image and the third pose; providing for display of the plurality of virtual trajectory points; and
(Continued)

providing an interface for manipulating the virtual trajectory points.

14 Claims, 4 Drawing Sheets

(52) U.S. Cl.
CPC ...... *G06T 7/70* (2017.01); *G05B 2219/39001* (2013.01); *G05B 2219/39024* (2013.01); *G06T 2207/10028* (2013.01); *G06T 2207/30241* (2013.01)

(58) Field of Classification Search
CPC . G06T 2207/10028; G06T 2207/30241; G06T 2200/24; G06T 2207/30108; G06T 2207/20096; G06T 17/00; G06T 7/73; G05B 2219/39024; G05B 2219/39001; G05B 2219/39438; G05B 2219/39443; G05B 2219/39449; G05B 2219/39451; G05B 2219/40607; G05B 19/42
See application file for complete search history.

(56) References Cited

U.S. PATENT DOCUMENTS 11,842,030 B2 * 12/2023 Koenig ............... G06F 3/04817
2004/0019407 A1 1/2004 Greene et al.
2005/0251290 A1 * 11/2005 Skourup ................ G05B 19/42 700/245
2011/0184544 A1 * 7/2011 Ikushima ........... G05B 19/4093 700/97
2014/0135986 A1 * 5/2014 Kanehara ............... B25J 9/1671 700/257
2015/0112482 A1 * 4/2015 Kuwahara ............. G06N 20/00 901/50
2017/0372139 A1 * 12/2017 Thomasson ............ G06V 20/20
2018/0126553 A1 * 5/2018 Corkum ................. B25J 9/1697
2019/0255706 A1 * 8/2019 Atohira ................... G06F 30/20
2020/0101599 A1 * 4/2020 Yoshida ................. B25J 9/1697
2021/0023718 A1 * 1/2021 Yoneyama ............. B25J 9/1671

OTHER PUBLICATIONS

JP 2001-060108 A, Saito, "Device and Method for Teaching Robot Action", Filed: Feb. 1, 2000, Pub: Mar. 6, 2001, English Translation, Provided in prior office action (Year: 2001).*
Intellectual Property Office of Singapore, International Search Report for International Application No. PCT/SG2020/050709, mailed Feb. 2, 2021, 3 pages.
Intellectual Property Office of Singapore, Written Opinion of the International Searching Authority for International Application No. PCT/SG2020/050709, mailed Feb. 2, 2021, 6 pages.

* cited by examiner

METHOD AND SYSTEM FOR PROGRAMMING A ROBOT

CROSS-REFERENCE TO RELATED APPLICATIONS

The present application is a U.S. national stage application of International Application No. PCT/SG2020/050709, filed Dec. 1, 2020, which claims priority to and the benefit of International Application No. PCT/SG2019/050606, filed Dec. 9, 2019, the contents of which are incorporated herein by reference and made a part hereof.

The present invention relates to a system and a method for programming a robot to perform a sequence of trajectory points. More specifically, present invention relates to ways in which a robot is programmed visually in an operating environment.

Robots are often used for processing the surface of an object. Existing practice for programming a robot involves teaching the robot a sequence of trajectory points. The robot is taught how to perform the task by being guided through the various trajectory points along the desired operating path during the programming. Alternatively, if a three-dimensional (3D) CAD model of the object exists, a person with a robotics background teaches the trajectory points in a robot simulation system, so called off-line programming.

The present invention relates to a computer-implemented method which comprises identifying, within an environment, a robotic device and a calibration fixture in a vicinity of the robotic device, referencing the calibration fixture to a predetermined portion of the robotic device to determine a first pose of the robotic device relative to the calibration fixture, receiving, from a sensor, a 3D image of the environment wherein the 3D image includes the calibration fixture, determining, based on the 3D image, a second pose of the calibration fixture relative to the sensor, determining a third pose of the robotic device relative to the sensor based on the first pose and the second pose, receiving a plurality of trajectory points from a display interface or a device interface, determining a plurality of virtual trajectory points corresponding to the plurality of trajectory points based on the 3D image and the third pose.

The present invention further relates to a system for programming a robotic device. The system comprises a sensor and a computing system communicably coupled thereto and configured to perform a method according to any one of the embodiments disclosed herein.

The present invention further relates to a non-transitory computer-readable medium having stored therein instructions, that when executed by a computing system, cause the computing system to perform a method according to any one of the embodiments disclosed herein.

The example embodiments described herein are not meant to be limiting. It will be readily understood that certain aspects of the disclosed method and system can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are illustrated in the Figure.

Example system and method are provided that use sensor, which may be coupled to display interface, to acquire 3D image of environment, wherein the 3D image includes robot, object and calibration fixture. The 3D image is used to create, manipulate and/or manage trajectory points of the robot. The image of the environment refers to the 2D image on the display interface. The display interface, coupled with the sensor, is used to visualize and manage trajectory points for a robot within an actual image of the robot's environment.

According to one embodiment, a method is provided, which comprises identifying, within an environment, a robotic device and a calibration fixture in a vicinity of the robotic device. The robotic device is also called a robot. For example, if the robotic device is an industrial robot, it carries an end-effector comprising a tool for performing the processing, for instance a welding tool or a painting tool. The identifying of the robotic device refers to identifying the presence of the robotic device. The identifying may further include identifying further information referring to the robotic device, e.g. an identification number, a make, a model, a position, an orientation, and/or a state of the robotic device. The identifying may include providing the robotic device. Alternatively or additionally, the identifying may refer to identifying a position of the robotic device in sensor data, e.g. image data, magnetic field data, electric field data, a signal transmitted via a cable, a signal transmitted wirelessly, or any other data which can be used to identify the robotic device. The calibration fixture may be marked in order to be visually distinctive, for example with a color marking, a bar code, a two-dimensional code, or a distinctive coating.

Further, the method comprises referencing the calibration fixture to a predetermined portion (e.g. base) of the robotic device to determine a first pose of the robotic device relative to the calibration fixture. The referencing may be based on a referencing signal. For example, the referencing may include using a referencing rail, a distancing device (e.g. a laser based distancing device), an image sensor, or another signal which can be used to reference the calibration fixture to a base of the robotic device.

Further, the method comprises receiving, from a sensor, a 3D image of the environment wherein the 3D image includes the calibration fixture. The 3D image may show a robot, an object and a calibration fixture. The 3D image is used to create, manipulate and/or manage trajectory points. The 3D image may comprise a series of infrared images, a series of structured light images, a series of still images, of dynamic range images, of shot noise images, of red noise images, of dark noise images and/or a video stream. The sensor capturing the 3D image may be a depth sensor and/or a 3D sensor. The sensor may be coupled to a display interface for showing the 3D image. The calibration fixture may be a 3-dimensional (3D) object that is used to work out and detect the pose and in general the movement of the robot (translation and rotation) in its environment by using a sensor.

Since the method does not rely on using an entirely virtual 3D model (e.g., a computer-aided design or "CAD" model), an inaccurate 3D model can lead to a trajectory being commanded which unexpectedly causes the robot to collide with object or environment. Therefore, the method is more secure.

Further, the method comprises determining a second pose of the calibration fixture relative to the sensor based on the 3D image. Therein, the determining may comprise identifying one or more fiducial markers in estimating the position and/or the orientation of the calibration fixture, and/or the position and/or the orientation of the robotic device. A fiducial marker, which can also be called a fiducial, is an object placed in the field of view of the sensor which appears in the image produced, for use as a point of reference or a measure. For example, the fiducial marker may be a color dot, a barcode or a recognizable object. For example, the fiducial marker is painted onto, attached to, or placed on the calibration fixture and/or the robotic device. Additionally or alternatively, the determining may be based on a 3D shape recognition of a calibration marker. Therein, the calibration marker may be a 3D structure or object attached to or forming a part of the calibration fixture. Alternatively, the calibration fixture as a whole may be a calibration marker. Further, a calibration marker may be a 3D structure attached to or forming a part of the robotic device. Alternatively, the robotic device as a whole may be a calibration marker. Therein, the 3D shape recognition may comprise pattern recognition, pattern matching, machine learning, or any other suitable shape recognition technique.

Since the method comprises determining a second pose of the calibration fixture relative to the sensor based on the 3D image, the second pose can be determined quickly without requiring additional equipment. When the second pose is determined based on the 3D shape recognition, the accuracy of the determining is improved even further.

Further, the method comprises determining a third pose of the robotic device relative to the sensor based on the first pose. Alternatively, the determining of a third pose can be based on the first pose and the second pose.

Further, the method comprises receiving a plurality of trajectory points. The trajectory points, which may also be called waypoints, define the path which the robot shall follow during the processing of the object. A trajectory point comprises a three-dimensional position and three-dimensional orientation information. These trajectory points are stored as instructions into a memory in or coupled to the robot control unit or a computing system of the robot. During operation of the robot, the program instructions are executed, thereby making the robot operate as desired. The trajectory points may be provided in the form of user entry via the display interface or in the form of robotic scripts via a device interface.

Further, the method comprises determining a plurality of virtual trajectory points corresponding to the plurality of trajectory points based on the 3D image and the third pose. The trajectory points may have been previously programmed by a user as three-dimensional points relative to the predetermined portion (e.g. base) of the robot without knowledge of the robot's current environment.

Since the method comprises determining a plurality of virtual trajectory points corresponding to the plurality of trajectory points based on the 3D image and the third pose, the method does not require the user or operator who is programming the robot to have knowledge about computer science. Therefore, the operator who is programming the robot may be a person who has good implicit knowledge of the movements and process performed by the robot. Therefore, the method is less costly, does not require a 3D CAD model of the object and is intuitive to use.

Further, optionally, the method comprises receiving a 2D image of the environment. Therein, the 2D image of the environment may be received from a camera included in a display device, or coupled to a display device. Alternatively, the 2D image of the environment may be received from a camera included in the sensor, or coupled to the sensor.

Further, optionally, the method comprises providing for display of the 2D image of the environment overlaid with a plurality of virtual trajectory points.

Since the method comprises providing for display of the 2D image of the environment overlaid with a plurality of virtual trajectory points, if a 3D model of the environment is not accurate or the environment has changed, a trajectory which unexpectedly causes the robot to collide with an object in the environment or produces other unexpected results can easily be determined. Therefore, the method is more secure and predictable. Further, since the method comprises providing for display of the 2D image of the environment overlaid with a plurality of virtual trajectory points, an operator can determine if he has missed some part of a process, for instance some part of a surface in a painting operation, without running the program for a test. Thus, a single iteration may suffice to achieve a programming of satisfactory quality.

Further, optionally, the method comprises providing an interface for manipulating virtual trajectory points through a display interface.

Since the method comprises providing an interface for manipulating virtual trajectory points through the display interface, the method does not require physical movement of the robot. Therefore, the method is less time consuming, less troublesome, and less error prone. Further, an acceptable program can be achieved in one single or just a few iterations.

Thus, this method provides an intuitive visualization of robot trajectory points and simplifies the robot programming.

The method may also comprise providing for display of the 3D image which may or may not be superimposed on the 2D image of the environment.

In order to determine where to project a robot's trajectory points into an image on display interface, the pose (position and orientation) of the robot relative to sensor may be determined. The pose of robot may be determined by processing the 3D image of calibration fixture. Once the pose of robot relative to sensor is determined, pose of one or more trajectory points may be projected on display interface, or optionally projected into an augmented reality presentation on display interface, to allow user to visualize the trajectory of robot within its given environment.

The calibration fixture is an object with 3D features that are used to determine the pose of robot relative to sensor. The calibration fixture may be placed within the environment of robot with determined relative pose between robot and calibration fixture. When the sensor acquires a 3D image of the environment, wherein the 3D image includes a representation of the calibration fixture, the pose of the robot relative to the sensor can thereby be determined.

In another embodiment, the method may further comprise receiving, from a device interface, input data indicating one or more adjustments to one or more properties of one or more of the plurality of the virtual trajectory points. Therein, the properties are one or more selected from the group consisting of a trajectory position, a trajectory orientation, an end-effector state, a trajectory speed, an electronic signal input and an electronic signal output. The device interface may be a display interface of the display device, or input interface of a mobile, laptop, notebook, or desktop computer. The input data indicates adjustments, wherein each adjustment relates to one or more properties of one or more of the virtual trajectory points. For example, the input data may comprise data indicating an adjustment to one property of one trajectory point, e.g. a trajectory orientation of one trajectory point. As another example, the input data may comprise data indicating an adjustment to a trajectory orientation of one trajectory point, and data indicating an adjustment to a trajectory speed of another trajectory point. Further, the method according to this embodiment may comprise receiving, from the device interface, input data to create, duplicate or delete one or more of the virtual trajectory points. Further, the method may comprise determining, based on the received input data on the display interface, one or more adjusted properties of one or more of the trajectory points that correspond to the one or more of the plurality of virtual trajectory points.

In another embodiment, the method may further comprise receiving, from an interface of a device that includes the sensor, input data that provides instructions for the robotic device to move in accordance to one or more of the trajectory points or virtual trajectory points and their respective properties, transmitting the aforementioned instructions to the robotic device.

The aforesaid received trajectory points may include reference to or are based on one of various coordinates. For example, trajectory points which may be received from user input via a display interface may be based on virtual coordinates, and therefore may be referred to as virtual trajectory points. In another example, trajectory points received as robotic scripts may be based on physical or robotic coordinates, and therefore may be referred to as physical trajectory points. As virtual coordinates are likely distinct from physical or robotic coordinates used by the robotic device, if the received trajectory points are virtual trajectory points, they would require translation or conversion into physical trajectory points which are then transmitted to the robotic device for execution. Accordingly, the step of transmitting the aforementioned instructions to the robotic device may comprise translating the virtual trajectory points to physical trajectory points and sending the physical trajectory points to the robotic device.

In another embodiment, the method may further comprise providing for a display interface for manipulating the virtual trajectory points, receiving, from a display interface, input data indicating creation of and/or adjustment to trajectory pattern that comprises plurality of virtual trajectory points arranged in specified pattern. Further, the method may comprise, based on the trajectory pattern created or adjusted, converting the two-dimensional trajectory pattern into a three-dimensional trajectory pattern on display interface. Further, the method may comprise receiving, from the display interface, input data to translate and/or rotate the three-dimensional trajectory pattern on the display interface. Further, the method may comprise receiving, from the display interface, input data to project the three-dimensional trajectory pattern onto a portion of 3D image. Therein, in one embodiment, the 3D image may be superimposed on 2D image on display interface. Alternatively, the 3D image may be displayed without the 2D image.

According to another embodiment, a system for programming a robotic device is provided. The system comprises a sensor and a computing system communicably coupled thereto and configured to perform a method according to an embodiment.

Further, the system may be coupled or connected to a memory of the robotic device for storing trajectory points into the memory. Alternatively, the system may be coupled or connected to a control of the robotic device, such that the system may operate the robotic device according to the trajectory points.

According to another embodiment, a non-transitory computer-readable medium is provided. The computer-readable medium has instructions stored therein, that when executed by a computing system, cause the computing system to perform functions according to an embodiment of the method described herein.

According to another embodiment, a method is provided. The method comprises identifying, within an environment, a robotic device and a calibration fixture in a vicinity of the robotic device, referencing the calibration fixture to a predetermined portion (e.g. base) of the robotic device to determine a first pose of the robotic device relative to the calibration fixture, receiving, from a sensor, a 3D image of the environment wherein the 3D image includes the calibration fixture, determining, based on the 3D image, a second pose of the calibration fixture relative to the sensor, determining a third pose of the robotic device relative to the sensor based on the first pose and the second pose, providing an interface for creating a virtual trajectory point, and determining a trajectory point corresponding to the virtual trajectory point based on the 3D image and the third pose.

In embodiments comprising a method, system, and/or non-transitory computer-readable medium according to any one of the embodiments disclosed herein, the plurality of trajectory points are no more than one trajectory point, and the plurality of virtual trajectory points are no more than one virtual trajectory point.

For a better understanding of the embodiments, together with other and further features and advantages thereof, reference is made to the following description, taken in conjunction with the accompanying drawings. The scope of the invention will be pointed out in the appended claims.

Figure 1:
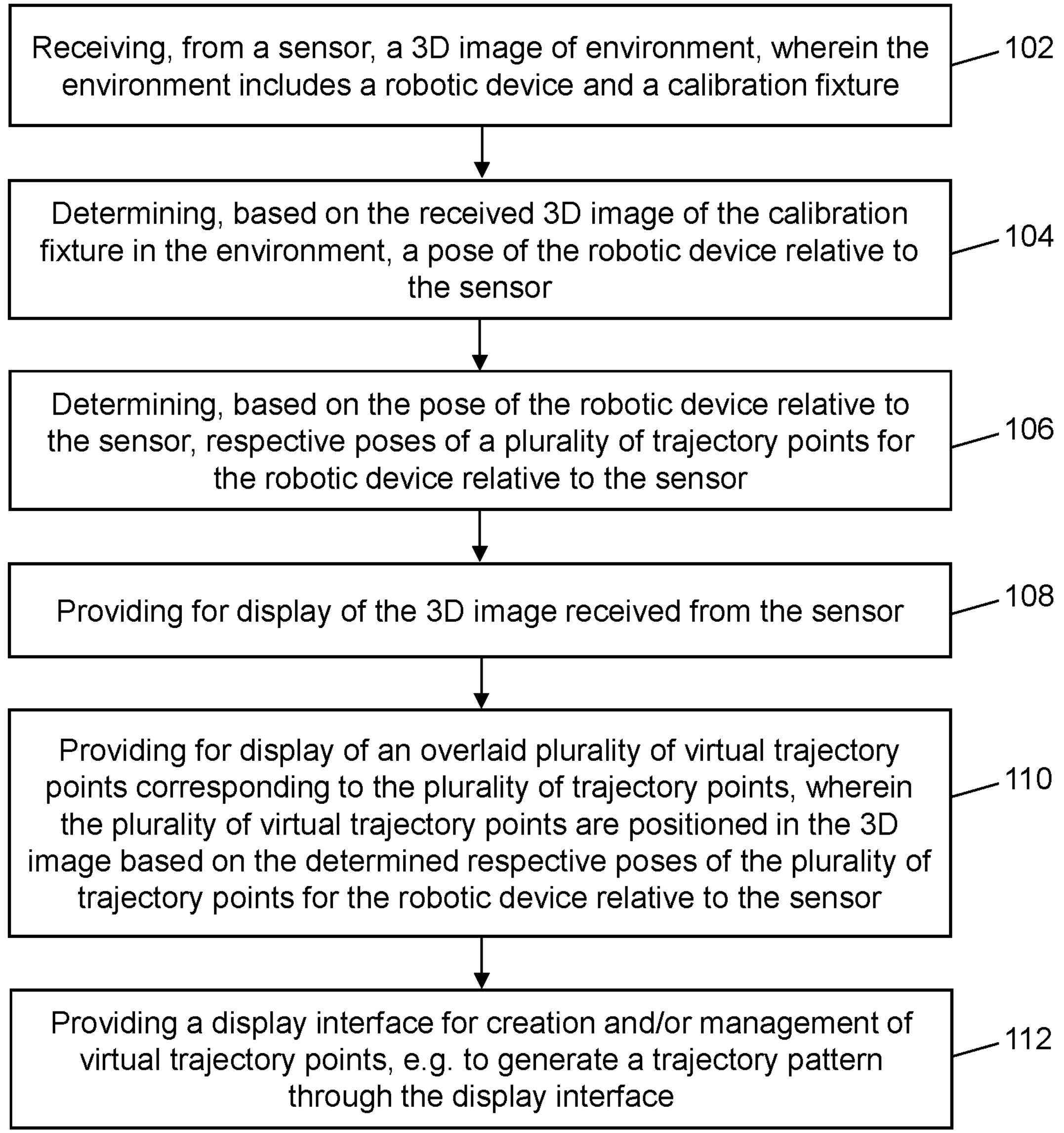
FIG. 1 shows a flowchart illustrating a method according to an embodiment.

Referring to the figures, FIG. 1 illustrates a flowchart showing a method 100 that may allow for determination of third pose (relative pose between robot and sensor), and/or creation or management of robot trajectory points using 3D image acquired by sensor. Method 100 may be carried out using a display device that includes a camera, such as a tablet device, a smartphone, a head-mounted display (HMD), or using a mobile, laptop, notebook, or desktop computer. A sensor that is separate from the display device may be used, however the sensor may be coupled to the display device through a physical fixture or adhesive medium. The sensor may also or alternatively be communicably coupled to the display device through cable (wired) or wireless connection.

As shown by block 102 of FIG. 1, method 100 comprises receiving 3D image of environment from the sensor. The sensor may be a depth sensor and/or 3D sensor. The 3D image may be a composition of a series of Infra-red images, a series of structured light images, a series of still images, and/or video stream. The 3D image may be a single still infra-red and/or structured light images. The environment may include at least one robotic device and a calibration fixture.

Referring to FIG. 1, method 100 further comprises determining pose of robotic device relative to sensor, as illustrated by block 104. The 3D image of environment may be processed to determine where the robotic device is located within the environment relative to the sensor. Determining the pose of robotic device includes determining the position (X, Y, Z) and orientation (roll, pitch, yaw) of robotic device relative to sensor. The pose of robotic device relative to sensor may be determined by processing the 3D image that includes calibration fixture. By recognizing the 3-dimensional features on the calibration fixture in the 3D image, the translation and rotation of the robotic device from the sensor can be determined. The system may have prior knowledge of the relative pose between robotic device and calibration fixture, thereby allowing the pose of robotic device relative to sensor to be determined.

Method 100 optionally further comprises determining poses of trajectory points for robotic device relative to the sensor, as shown in block 106 if augmented reality presentation is desired. When the pose of robotic device relative to the sensor is determined, the robot may be used as a reference point to determine where to virtually overlay trajectory points as part of an optional augmented reality presentation. As the sensor is coupled to the display device with known relative displacement, the relative pose between robot and visual camera can be derived from the relative pose between visual camera and sensor through pose compensation based on known relative displacement between sensor and visual camera on display device. Therein the pose of trajectory points relative to visual camera of display device can be determined based on the relative pose between robotic device and sensor. These locations, e.g. relative displacement between sensor and visual camera on display device, may be used to virtually overlay the trajectory points into 2D image captured by visual camera of display device.

In a step not depicted in FIG. 1 for simplicity, the method 100 optionally comprises receiving a 2D image of the environment. Therein, the 2D image is received from the sensor. In an alternative embodiment, the 2D image may be received by a further camera, which is preferably located in a position close to the sensor and the orientation of which is identical to that of the sensor.

As shown in block 108, the method 100 comprises a step of providing for display of the 3D image which was received in block 102. Optionally, the 3D image may be superimposed on the 2D image of the environment.

In a step not depicted in FIG. 1 for simplicity, the method 100 comprises receiving a plurality of trajectory points. Further, the method 100 comprises determining a plurality of virtual trajectory points corresponding to the plurality of trajectory points based on the 3D image and the position of the robotic device relative to the sensor, which was determined in block 106. Therein, each virtual trajectory point is positioned in the 3D image in such a way that it is superimposed with the exact position of its corresponding trajectory point in the corresponding 3D image. I.e., if for example a trajectory point is positioned at a lower junction of the robotic device, its corresponding virtual trajectory point is positioned at the 3D representation of the lower junction of the robotic device in the 3D image. Optionally, each virtual trajectory point is positioned in the 2D image in such a way that it is superimposed with the exact position of its corresponding trajectory point in the corresponding 3D image.

As shown in block 110, the method 100 further comprises providing for display of the 3D image, overlaid with the determined plurality of virtual trajectory points. Optionally, the method 100 further comprises providing for display of the 2D image of the environment, overlaid with the determined plurality of virtual trajectory points.

As shown by block 112 of FIG. 1, method 100 may comprise overlay of virtual trajectory points on the 3D image that is presented on display interface. Optionally, block 112 of method 100 may comprise overlay of virtual trajectory points on the 2D image of environment that is presented on display interface. The image of environment may be a 2D image acquired by visual camera on the display device. The image of environment may include the entire robotic device, a portion of the robotic device, or none of the robotic device. Additionally, the image of environment may include the entire calibration fixture, a portion of calibration fixture, or none of the calibration fixture. Additionally, the image of environment may be a single still 2D image, a series of still 2D images, and/or video stream.

As shown by block 112 of FIG. 1, method 100 may further comprise creating and/or managing virtual trajectory points through display interface. In other words, a trajectory or trajectory pattern to be executed or performed by the robotic device may be generated. A user interface associated with display interface may receive input data indicating one or more changes to virtual trajectory of the robotic device. For example, the display interface may include a touch-based interface aligned with the 3D images and/or optionally 2D images. The virtual trajectory points may be created, deleted and/or duplicated through input data on display interface. The properties of each virtual trajectory points, such as position, orientation, end-effector state, trajectory speed, electronic signal input and electronic signal output, may be adjusted through input data on display interface. The trajectory points of robotic device correspond to the virtual trajectory points on display interface. The robotic device may be commanded to execute the trajectory, wherein the trajectory comprises a sequence of at least some of the plurality of trajectory points. The robotic device may be commanded to execute the properties of each trajectory point along the trajectory. For instance, the end-effector may be commanded to be activated mid-way through the trajectory, as per instructed through the input data on display interface.

The functionality described in connection with the flowcharts described herein can be implemented as special-function and/or configured general function hardware modules, portions of program code for achieving specific logical functions, determinations, and/or steps described in connection with the flowchart shown in FIG. 1. Where used, program code can be stored on any type of computer-readable medium, for example, such as a storage device including a disk or hard drive.

Functions in the flowchart shown in FIG. 1 may be executed out of order from that shown or discussed, including parallel execution of separately described functions or even in reverse order, as long as the overall functionality of the described method is maintained. Functions in the flowchart shown in FIG. 1 may be selectively executed. For example, one embodiment may perform calibration of robot relative sensor; another embodiment may perform, in addition to calibration, visualization of virtual trajectory points for robot through augmented reality presentation; another embodiment may perform, in addition to calibration, visualization of virtual trajectory points for robot using 3D image; another embodiment may perform, in addition to calibration and aforesaid visualization in augmented reality and/or using 3D image, creation or management of robot trajectory points using 3D image acquired by sensor. Other combinations may also be possible.

Figure 2:
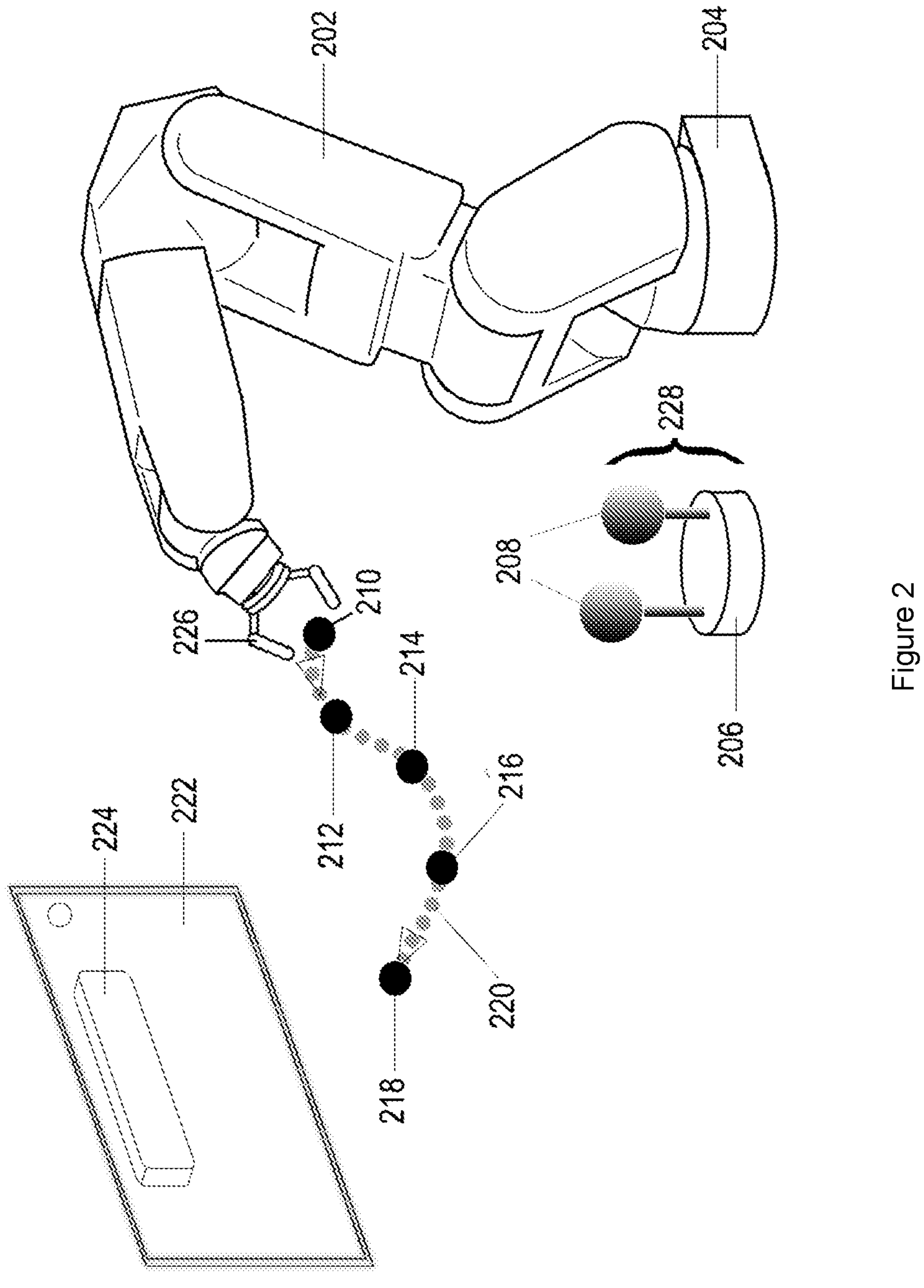
FIG. 2 illustrates a system according to an embodiment.

FIG. 2 illustrates the system which comprises of robotic device 202, calibration fixture 228, display device 222, and sensor 224.

The robotic device 202 includes a predetermined portion, e.g. base 204 which may be stationary base or mobile base. The robotic device may be controlled to operate and move along trajectory 220 which includes trajectory points 210-218. Additionally, the robotic device may include end-effector 226 that may take the form of gripper such as finger gripper or different type of gripper such as suction gripper. The end effector may take the form of tool such as drill, brush or paint gun. The end effector may include sensors such as force sensors, proximity sensors or camera. Other examples may also be possible.

The display device 222 may be a device that includes an interface and optionally a visual camera that captures 2D image of the environment. For instance, the display device may be a tablet computer, a handheld smartphone, or part of a mobile, laptop, notebook, or desktop computer.

The sensor 224 may be a depth sensor and/or 3D sensor that acquires 3D image of the environment. The 3D image may be a composition of a series of Infra-red images, a series of structured light images, a series of still images, and/or video stream. The 3D image may be a single still infra-red and/or structured light images. The sensor 224 may be physically secured to the display device 222 through fixture or adhesive medium. The fixture to couple sensor to display device may possess a detachable mechanism or a non-detachable mechanism. For the display device 222 to receive 3D image from sensor 224, the sensor 224 may be connected to the display device 222 through a cable (wired) or a wireless connection.

The calibration fixture 228 is an object with 3-dimensional features that is placed in the environment of robotic device. According to the example embodiment in FIG. 2, the calibration fixture 228 may have a base 206 and asymmetrical geometric features 208 attached to the base. The base 206 may be used to locate or adhere calibration fixture 228 onto surface in environment such as table, wall or object. In the example embodiment, the asymmetrical geometric features 208 may include two spherical objects with different sizes and/or different positions. However, example embodiments described herein are not meant to be limiting. Asymmetrical geometric features may be achieved by configurations not shown in the example embodiment. For instance, the asymmetrical geometric features on calibration fixture may comprise of additional shapes or features that may be semi-spherical, cylindrical, conical, rectangular, triangular, trapezoidal, oval, sinusoidal, concave, convex, or combinations or variations thereof.

By recognizing the asymmetrical geometric features 208 on calibration fixture 228 in 3D image acquired by sensor 224, the pose of calibration fixture 228 relative to sensor 224 may be determined. As the pose of robotic device 202 relative to calibration fixture 228 may be known, the pose of robotic device 202 relative to sensor 224 may thereby be determined by recognizing the calibration fixture 228 in 3D image.

In an alternative embodiment, the calibration fixture may have a base and 3D symmetrical geometric features attached to the base. Examples of symmetrical geometric features may include the aforementioned shapes or features applicable to asymmetrical geometric features. In an alternative embodiment, the calibration fixture may have a base and 3D non-geometric or irregular-shaped features attached to the base. Such non-geometric features may be symmetrical or asymmetrical. In an alternative embodiment, the count of 3D features may be one or more than one.

Figure 3:
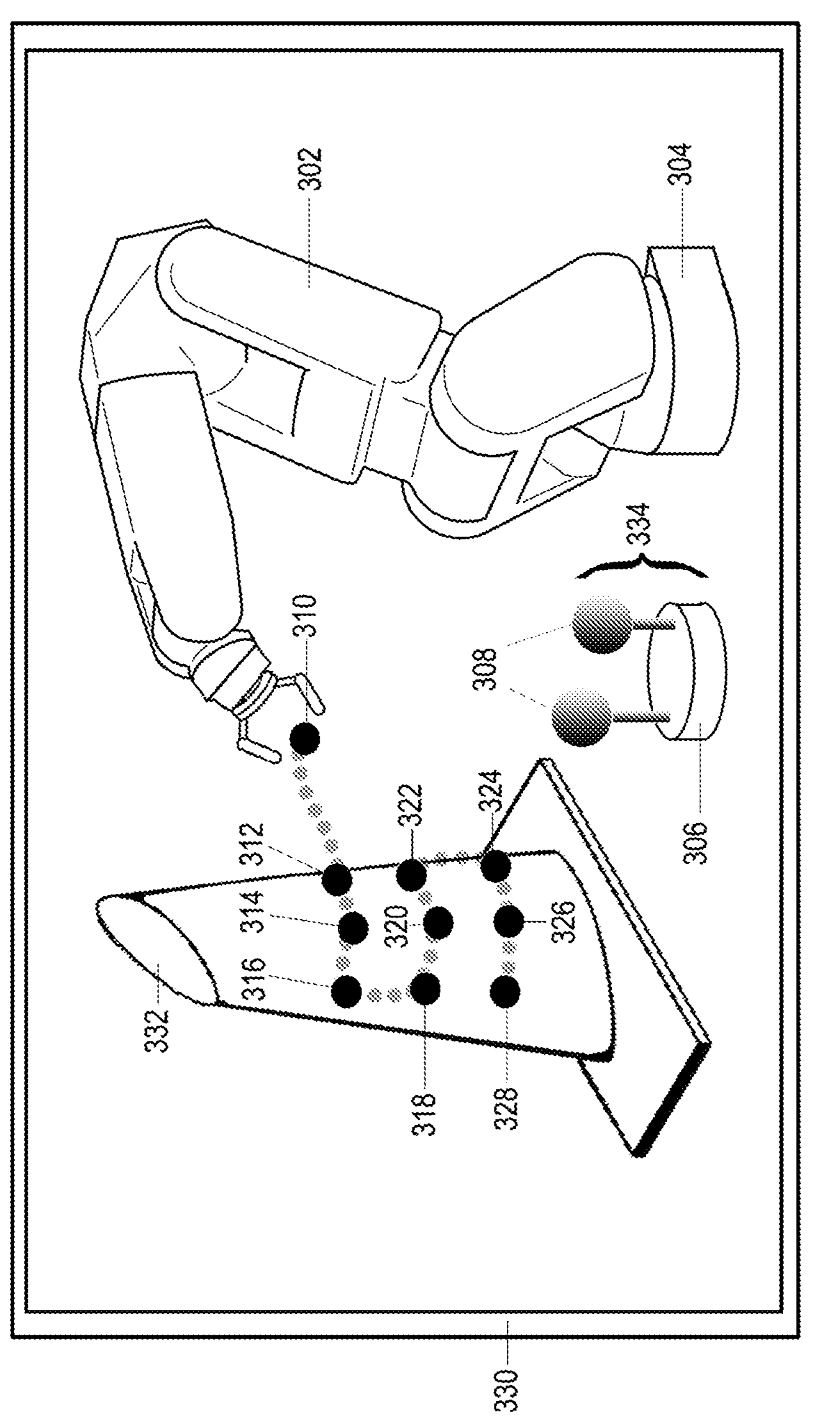
FIG. 3 illustrates a 2D image of display interface.

FIG. 3 illustrates a 2D image of display interface 330 where virtual trajectory points 310-328 are placed onto an object 332. The display interface 330 may be an interface of display device 222. The 2D image of display interface 330 may be a single still image, or a video stream that is continuously received from the visual camera of display device 222. As orientation of display device 222 changes, the 2D image on display interface 330 may be updated to display portions of the environment from corresponding point of view.

With reference to FIG. 3, the virtual trajectory points 310-328 may be projected on display interface 330 or optionally in Augmented Reality presentation on display interface 330. The virtual trajectory points correspond to trajectory points of robotic device 302. The poses of trajectory points 310-328 for robotic device 302 relative to the sensor are determined based on block 106 of FIG. 1. The virtual trajectory points are overlaid onto display interface 330 based on block 112 of FIG. 1. Only a subset of trajectory points, reflected by the virtual trajectory points 310-328, may be projected on display interface 330 depending on the orientation of display device 222. The robotic device may be commanded to move through the sequence of trajectory points, as reflected by virtual trajectory points 310-328 shown on display interface 330.

With reference to block 108 of FIG. 1, the 3D image acquired by the sensor 224 may be superimposed on display interface 330 or optionally with 2D image of environment on display interface 330. The 3D image may be visible or invisible while superimposed on the 2D image of environment on display interface 330. The block 112 of FIG. 1 comprises creating and/or managing virtual trajectory points on display interface. The creation and/or management of virtual trajectory points may be performed on the 3D image that may or may not be superimposed on 2D image of environment on display interface 330. For example, the position of input on display interface 330 is projected onto the 3D image and subsequently creates the corresponding virtual trajectory point at the position where a ray-cast from input position on display interface 330 intersects with the 3D image. In this manner, the virtual trajectory points, thus the trajectory points, may be accurately created and/or managed with respect to the environment and robotic device 302. As shown in FIG. 3, the virtual trajectory points 312-328 are placed over the 3D image of object 332 that may or may not be superimposed on 2D image of the object 332 on device interface 330, wherein the virtual trajectory points 312-328 may appear to be positioned on the surface of the object 332 on device interface 330.

With reference to FIG. 3, the calibration fixture 334 may be used to determine the pose of robotic device 302 relative to the sensor 224. The calibration fixture 334 may not need to be constantly captured by the sensor 224 and visual camera of display device 222 for proper overlay of virtual trajectory points on the display interface 330. The calibration fixture may comprise of asymmetrical geometric features 308 and a base 306.

Figure 4:
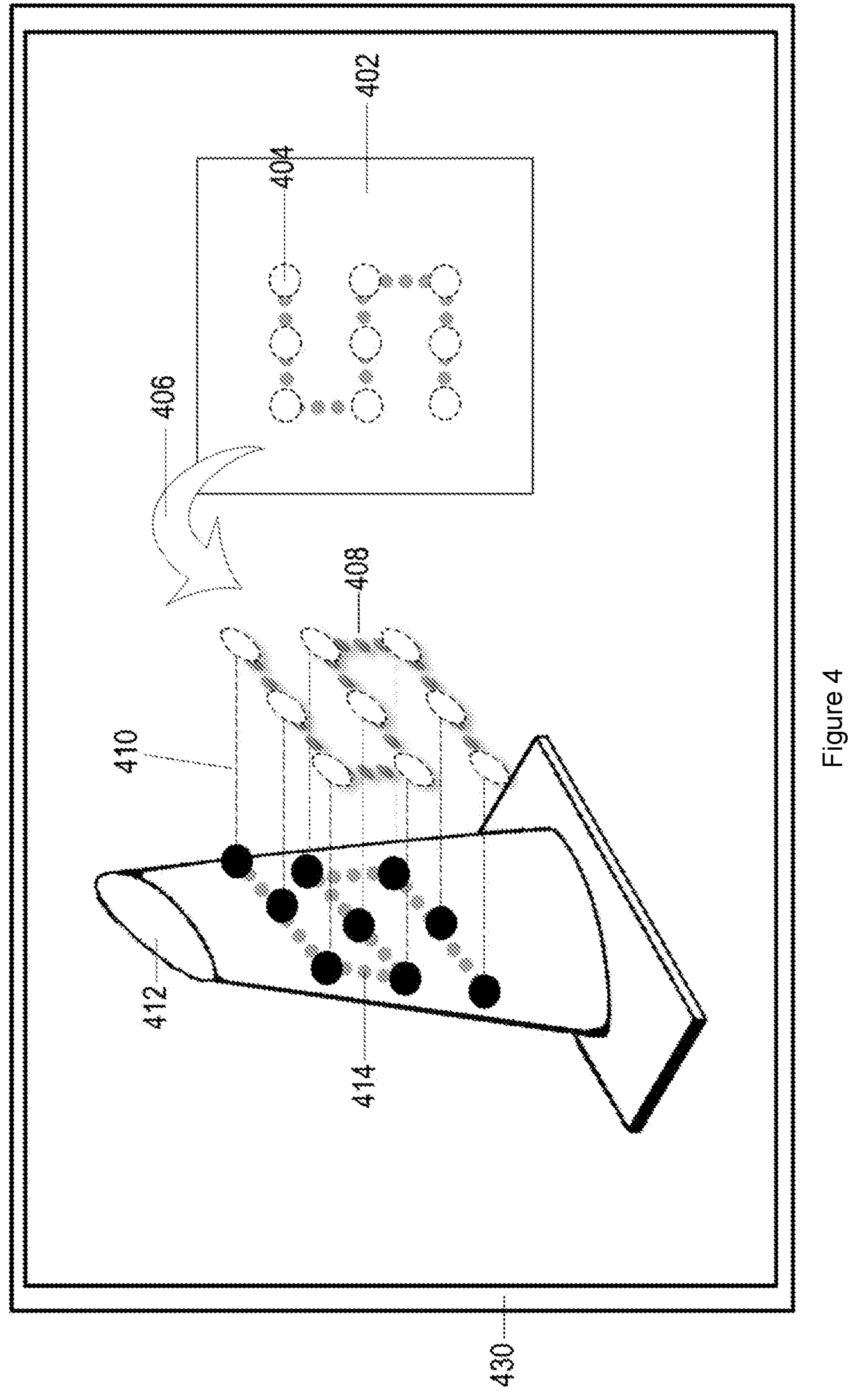
FIG. 4 illustrates an image of a trajectory pattern being projected onto a 3D image of an object using a method according to an embodiment.

FIG. 4 illustrates an image of trajectory pattern being projected onto 3D image of object 412. The display interface 430 may include a subset of user interface 402 that may allow user to define trajectory pattern 404. For example, the user interface 402 may allow user to define the properties of the trajectory pattern. The aforementioned properties may include dimensions (vertical and horizontal length) of trajectory pattern 404, number and/or density of trajectory points along the trajectory pattern 404 and frequency of stepover. The user interface 402 may provide preview of the trajectory pattern 404 defined by user. The trajectory pattern may not be limited to the raster pattern illustrated in example embodiment, the trajectory pattern may be of other patterns including zig-zag, spiral, contour and fishtail.

The trajectory pattern 404 may undergo a process 406 that converts the two-dimensional trajectory pattern 404 on user interface 402 into three-dimensional trajectory pattern 408.

The three-dimensional trajectory pattern 408 may be translated and rotated along its three-dimensional coordinate frame upon input data received on display interface 430. The three-dimensional trajectory pattern 408 may be projected onto 3D image of object 412, resulting in projected trajectory pattern 414 that conforms to the surface of object 412. Each virtual trajectory point on three-dimensional pattern 408 may be projected onto the surface of object 412 via respective projection path 410, wherein the projection path 410 includes origin at their respective position on the three-dimensional trajectory pattern 408 and a projection orientation that may be orthogonal to the plane of the three-dimensional trajectory pattern 408. The projection of three-dimensional trajectory pattern 408 may not be limiting to the object 412 shown in the example embodiment. For instance, the three-dimensional trajectory pattern 408 may be projected on other objects not shown in the example embodiment such as turbine blade, aerofoil, metal sheet or other manufacturing component. The three-dimensional trajectory pattern 408 may be projected on the environment wherein the environment is not inclusive of object 412 or robotic device, for example table, floor, wall, fixture or conveyor system.

The present disclosure is not to be limited in terms of particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from foregoing descriptions. Such modifications and variations are intended to fall within the scope of the appended claims.

The above detailed description describes various features and functions of the disclosed system and method with reference to the accompany figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a variety of different configurations, all of which are explicitly contemplated herein.

A block that represents a processing of information, such as a block of method described above, may correspond to circuitry that can be configured to perform the specific logical functions of a herein-described method or technique. Alternatively, or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as storage device including a disk or hard drive or other storage medium.

A block that represents one or more information transmissions may correspond to information transmission between software and/or hardware modules in the same physical device. However other information transmissions may be between software modules and/or hardware modules in different physical devices.

The computer readable medium may also include non-transitory computer readable media such as computer readable media that stores data for short periods of time like register memory, processor cache, and random-access memory (RAM). The computer readable media may also include non-transitory computer readable media that stores program code and/or data for longer periods of time, such as secondary or persistent long-term storage, like read only memory (ROM), optical or magnetic disks, compact-disc read only memory (CD-ROM). The computer readable medium may be considered a computer readable storage medium or a tangible storage device.

The particular arrangements shown in the figures should not be viewed as limiting. It should be understood that other embodiments can include more or less of each element shown in a given figure. Some of the illustrated elements can be combined or omitted.

It should be understood that the articles "a", "an" and "the" as used with regard to a feature or element include a reference to one or more of the features or elements. The term "and/or" includes any and all combinations of one or more of the associated feature or element. The terms "comprising", "including", "involving", and "having" are intended to be open-ended and mean that there may be additional features or elements other than the listed ones. Identifiers such as "first", "second" and "third" are used merely as labels, and are not intended to impose numerical requirements on their objects, nor construed in a manner imposing any relative position or time sequence between limitations. The term "coupled" may refer to physically coupling, electrically coupling, and/or communicably coupling. The term "coupled" when applied to two objects may refer to the two objects being coupled directly or indirectly through a third object.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

REFERENCES

100 method
102 block
104 block
106 block
108 block
110 block
112 block
202 robotic device
204 base
206 base
208 asymmetrical geometric features
210-218 trajectory points
220 trajectory
222 display device
224 sensor
226 end-effector
228 fixture
302 robotic device
306 base
308 asymmetrical geometric features
310-328 virtual trajectory points
330 display interface
332 object
334 calibration fixture 402 user interface
404 trajectory pattern
406 process
408 trajectory pattern
410 projection path
412 object
414 trajectory pattern
430 display interface

The invention claimed is:

1. A computer-implemented method comprising the steps of:

(i) identifying, within an environment, a robotic device and a calibration fixture in a vicinity of the robotic device;

(ii) referencing the calibration fixture to a predetermined portion of the robotic device to determine a first pose of the robotic device relative to the calibration fixture;

(iii) receiving, from a sensor, a 3D image of the environment wherein the 3D image comprises the calibration fixture, the environment, and an object disposed in the environment, wherein each of the object and the environment comprises a surface for processing by the robotic device;

(iv) determining, based on the 3D image, a second pose of the calibration fixture relative to the sensor;

(v) determining a third pose of the robotic device relative to the sensor based on the first pose and the second pose;

(vi) receiving a plurality of trajectory points from a display interface or a device interface;

(vii) determining a plurality of virtual trajectory points corresponding to the plurality of trajectory points based on the 3D image and the third pose, wherein the method further comprises the steps of:

(viii) receiving a 2D image of the environment;

(ix) providing, on the display interface, for display of the 2D image of the environment overlaid with the plurality of virtual trajectory points;

(x) providing, on the display interface, for display of the 2D image of the environment superimposed with the 3D image received from the sensor; wherein the 3D image being superimposed on the 2D image of the environment can appear visible or invisible on the display interface;

(xi) in response to changes in orientation of a display device which provides the display interface, updating the display interface to show at least a portion of the 2D image superimposed with 3D image from a corresponding point of view, wherein the method further comprises the steps of:

(xii) providing the display interface for manipulating the plurality of virtual trajectory points;

(xiii) receiving, from the display interface, input data indicating creation of and/or adjustment to a two-dimensional trajectory pattern that comprises the plurality of virtual trajectory points arranged in a specified pattern;

(xiv) based on the trajectory pattern created and adjusted, converting the two-dimensional trajectory pattern into a three-dimensional trajectory pattern on the display interface;

(xv) receiving, from the display interface, input data to translate and rotate the three-dimensional trajectory pattern on the display interface;

(xvi) receiving, from the display interface, input data to project the three-dimensional trajectory pattern onto the surface of the object or the environment comprised in the 3D image shown on the display interface, wherein the method further comprises the steps of:

(xvii) receiving, from the display interface, input data indicating one or more adjustments to one or more properties of one or more of the plurality of virtual trajectory points, the properties being one or more selected from the group consisting of a trajectory orientation, an end-effector state, and a trajectory speed;

(xviii) receiving, from the display interface, input data to create, duplicate or delete the one or more of the plurality of virtual trajectory points;

(xix) determining, based on the received input data on the display interface from step (xvii) and step (xviii), one or more adjusted properties of one or more of the plurality of trajectory points that correspond to the one or more of the plurality of virtual trajectory points.

2. The method according to claim 1, wherein the determining of a second pose of the calibration fixture relative to the sensor is based on recognizing a 3-dimensional feature of the calibration fixture in the 3D image.

3. The method according to claim 1, further comprising: providing for display of an overlaid virtual representation of a trajectory for the robotic device, wherein the trajectory comprises a sequence of at least some of the plurality of trajectory points.

4. The method according to claim 3, further comprising: generating and displaying a graphical representation of a trajectory orientation in one or a plurality of the virtual trajectory points;

generating and displaying a graphical representation of a tool performing a process along the trajectory.

5. The method according to claim 1, further comprising: receiving, from the display interface or the device interface, input data that provides instructions for the robotic device to move in accordance to one or more of the trajectory points or virtual trajectory points and their respective properties;

transmitting the aforementioned instructions to the robotic device.

6. The method according to claim 5, wherein transmitting the aforementioned instructions to the robotic device includes:

translating the virtual trajectory points to physical trajectory points and sending the physical trajectory points to the robotic device.

7. The method according to claim 1, wherein the trajectory points are in the form of user entry via the display interface or in the form of robotic scripts via the device interface.

8. The method according to claim 1, further comprising: interpolating or extrapolating, based on the 3D image, one or a plurality of trajectory points along the surface of the object and the environment.

9. The method according to claim 1, further comprising: transmitting robot information such as robot joint angles, robot status and an end-effector state from the robotic device to a mobile device, a laptop or desktop computer;

generating and displaying the received robot information on a virtual robot that is overlaid onto a representation of the real robotic device on the display interface.

10. A non-transitory computer-readable medium having stored therein instructions that, when executed by a computing system, cause the computing system to perform the method of claim 1.

11. A system for programming a robotic device, the system comprising:

a sensor; and a computing system communicably coupled to the sensor and configured to:

identify, within an environment, a robotic device and a calibration fixture in a vicinity of the robotic device;

reference the calibration fixture to a predetermined portion of the robotic device to determine a first pose of the robotic device relative to the calibration fixture;

receive, from the sensor, a 3D image of the environment wherein the 3D image comprises the calibration fixture, the environment and an object disposed in the environment, wherein each of the object and the environment comprises a surface for processing by the robotic device;

determine, based on the 3D image, a second pose of the calibration fixture relative to the sensor;

determine a third pose of the robotic device relative to the sensor based on the first pose and the second pose;

receive a plurality of trajectory points from a display interface or a device interface;

determine a plurality of virtual trajectory points corresponding to the plurality of trajectory points based on the 3D image and the third pose, wherein the computing system is further configured to:

receive a 2D image of the environment;

provide for display of the 2D image of the environment overlaid with the virtual trajectory points;

provide for display of the 2D image of the environment superimposed with the 3D image received from the sensor, wherein the 3D image being superimposed on the 2D image of the environment can appear visible or invisible on the display interface; and in response to changes in orientation of a display device which provides the display interface, update the display to show at least a portion of the 2D image superimposed with 3D image from a corresponding point of view, wherein the computing system is further configured to:

provide the display interface for manipulating the plurality of virtual trajectory points;

receive, from the display interface, input data indicating creation of and/or adjustment to a two-dimensional trajectory pattern that comprises the plurality of virtual trajectory points arranged in a specified pattern;

based on the trajectory pattern created and adjusted, convert the two-dimensional trajectory pattern into a three-dimensional trajectory pattern on the display interface;

receive, from the display interface, input data to translate and rotate the three-dimensional trajectory pattern on the display interface;

receive, from the display interface, input data to project the three-dimensional trajectory pattern onto the surface of the object or the environment comprised in the 3D image shown on the display interface, wherein the computing system is further configured to:

provide the display interface to adjust one or more properties of one or more of the plurality of virtual trajectory points, the properties being one or more selected from the group consisting of a trajectory orientation, an end-effector state, and a trajectory speed;

provide the said display interface to create, duplicate or delete the one or more of the plurality of virtual trajectory points;

determine one or more adjusted properties of one or more of the plurality of trajectory points that correspond to the one or more of the plurality of virtual trajectory points based on the one or more adjusted properties of one or more of the plurality of the virtual trajectory points.

12. The system according to claim 11, wherein the computing system is further configured to:

determine, based on recognition of 3D features of the calibration fixture in the 3D image, the second pose of the calibration fixture relative to the sensor.

13. The system according to claim 11, wherein the computing system is further configured to:

generate and display a graphical representation of a trajectory orientation in one or a plurality of the virtual trajectory points; and generate and display a graphical representation of a tool performing a process along a trajectory comprising a sequence of at least some of the plurality of trajectory points.

14. The system according to claim 11, wherein the computing system is further configured to:

receive, from the display interface or the device interface, input data that provides instructions for the robotic device to move in accordance to one or more of the trajectory points or virtual trajectory points and their respective properties;

transmit the aforementioned instructions to the robotic device, including translating the virtual trajectory points to physical trajectory points and sending the physical trajectory points to the robotic device.

* * * * *